US006322258B1

(12) United States Patent
Ryan et al.

(10) Patent No.: US 6,322,258 B1
(45) Date of Patent: Nov. 27, 2001

(54) INDOOR/OUTDOOR SURVEILLANCE HOUSING WITH ENVIRONMENTAL PROTECTION

(75) Inventors: Christopher J. Ryan, Lancaster; Theodore L. Jones, Akron, both of PA (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/351,089

(22) Filed: Jul. 9, 1999

(51) Int. Cl.[7] .................................................... G03B 17/00
(52) U.S. Cl. ........................................... 396/427; 396/433
(58) Field of Search .................................... 396/419, 427, 396/428, 433, 25; D16/203; 348/151, 143

(56) References Cited

U.S. PATENT DOCUMENTS

| | | | | |
|---|---|---|---|---|
| D. 414,504 | * | 9/1999 | Madden | D16/203 |
| 4,176,701 | | 12/1979 | Welgan | 206/316.2 |
| 4,320,949 | | 3/1982 | Pagano | 356/427 |
| 4,920,367 | * | 4/1990 | Pagano | 396/427 |
| 4,984,089 | * | 1/1991 | Stiepel et al. | 348/143 |
| 5,315,333 | * | 5/1994 | Nash | 396/448 |
| 5,689,304 | | 11/1997 | Jones et al. | 348/373 |
| 5,818,519 | * | 10/1998 | Wren | 396/427 |
| 5,852,754 | | 12/1998 | Schneider | 396/427 |

FOREIGN PATENT DOCUMENTS

| | | |
|---|---|---|
| 09073124A | 3/1997 | (JP) . |
| 09172564A | 6/1997 | (JP) . |

* cited by examiner

*Primary Examiner*—David M. Gray
(74) *Attorney, Agent, or Firm*—Ernestine C. Bartlett

(57) ABSTRACT

The invention provides an environmental shroud (490, 590) and a camera assembly (40, 50) including such environmental shroud (490, 590) which absorbs and dissipates heat energy that is not reflected and/or deflected from radiation and heat energy that is generated by the contents of the camera housing so that the camera housing temperature does not exceed the maximum rated temperature. In one embodiment, the camera assembly (40) includes a camera housing (430) which has a mounting cap (440) attached to sidewalls (426) to which is attached an optical surface (135). The camera housing encloses a camera system. An environmental shroud (490) is attached to the camera housing and includes a plurality of vertical strips (441,445) situated concentrically with the camera housing (430) and with each other with gaps being present between the vertical strips (441, 445) and between the camera housing (430). In another embodiment, the environmental shroud is a turbine and includes a plurality of vertical blades (506) situated concentrically with the camera housing (530), whereby wind which contacts the blades causes the shroud to rotate and generate a centrifugal force effective to remove moisture from the camera housing (530).

38 Claims, 7 Drawing Sheets

INDOOR/OUTDOOR SURVEILLANCE HOUSING WITH ENVIRONMENTAL PROTECTION

FIELD OF THE INVENTION

This invention relates to indoor/outdoor surveillance equipment and systems, and more particularly, to an improved camera assembly which has a housing that includes an environmental shroud.

BACKGROUND OF THE INVENTION

Closed-circuit surveillance equipment is well established and can include fixed-position cameras and zoom lenses mounted on pan and tilt mechanisms which are typically controlled by security personnel. In outdoor locations, an enclosure for the camera housing is usually employed and domed housing for such cameras are desirable due to their appearance as well as the fact that the camera itself is not easily visible, though the camera can scan a wide area.

In a typical outdoor camera enclosure, a single main housing part is utilized, wherein a top thereof is connected to a pipe. Electrical connections are generally routed from a main power source through the pipe and into the housing. In addition, a hemispheric dome and additional internal components, such as the camera power supply, camera body, lens, pan & tilt mechanism, and controller electronics, are removably attached to an inside of the single housing part. Such camera assemblies are subject to damage and require means to protect the camera from moisture and precipitation, extremes in temperature, and unauthorized tampering. For example, some conventional housings permit rain water or other moisture to accumulate and run down the conical side of the housing and onto the dome itself. Another concern is with the heat caused by sunlight or generated in the housing during use of the camera and the need to deflect such heat energy and/or to dissipate the same from the camera housing to prevent damage thereto.

Prior attempts to address some of these problems include U.S. Pat. No. 4,320,949 which, for example, in one embodiment provides a housing with a cover with a skirt over which rainwater may flow, form pendant drops, and fall, and a camera mount adapted to carry a camera and a camera positioning motor. A dome unidirectionally transparent to light is secured to the cover. The cover and dome form an air space between them. A fan is disposed in a side wall of the upper support housing to provide forced cool air circulation in the housing to cool the housing when the temperature reaches a certain predetermined level. The assembly also includes heaters which are operated when the temperature in the housing approaches freezing. In a second embodiment, air is brought into the assembly by natural circulation, i.e. a space or inlet area is provided at the interface of the support housing and cover member so that air can naturally enter the support housing about the circumference of the housing. This air is circulated downwardly adjacent the inner wall of the cover member and then up into the support housing where it is exhausted through an air exhaust port.

In U.S. Pat. No. 5,689,304, commonly assigned herewith, there is disclosed a surveillance housing assembly which comprises an outer shell having a top wall portion and side wall portion, wherein the side wall portion extends in a downward direction from the top wall portion to thereby define a first cavity. An inner shell comprises a top wall portion for mounting engagement with an underside of the top wall portion of the outer shell within the first cavity. The inner shell further comprises a top wall portion and a side wall portion, wherein the side wall portion extends in a downward direction from the top wall portion to thereby define a second cavity. The top wall portion 18 of the outer shell 12 has an exhaust aperture 32 positioned off-center from a central axis 34 of the outer shell; a generally circular aperture 36 is centered on the central axis and is provided in the top wall portion 18 to enable cable to pass through; and the top wall portion 22 of the inner shell 14 has an air exhaust aperture designed to be coincident with the air exhaust aperture 32 of the top wall portion 18 of the outer shell 12; and still further, the top wall portion 22 of the inner shell 14 has a generally circular aperture which is coincident with the aperture 36. Air inlet apertures 44 define an air flow to exhaust 32. The housing also has a decorative cap 70 which has a plurality of notches along its bottom edge which, cooperate with other parts to provide a path for an exhaust air flow and provides for protection against an ingress of unwanted water. This assembly also comprises various combinations of heaters and blowers. Further in this arrangement, a sequence of wall surfaces and plateau surfaces are arranged for securing components of the surveillance equipment thereto in a prescribed manner such that first components of the surveillance equipment are disposed in between the underside of the outer shell and an outerside of the inner shell, and second components of the surveillance equipment are disposed within the second cavity.

While air circulation via fans and exhaust ports and/or airintake valves and air-exhaust valves is satisfactory to compensate for environmental temperature changes in some surveillance systems, it has its limitations, most notably in terms of added cost and complexity, size and power constraints occasioned by the need to incorporate such components into the surveillance assembly.

There remains a need in the art for a camera surveillance system which does not suffer from the disadvantages set forth above and which provides protection to the camera from moisture and heat without imposing undesirable size and power constraints.

SUMMARY OF THE INVENTION

An object of the invention is to provide a camera housing with an environmental shroud which is designed to deflect or reflect the radiant heat energy generated by the sun or any other heat source so that the heat does not penetrate the camera housing.

Another object of the invention is to provide a camera housing having an environmental shroud which absorbs and dissipates heat energy that is not reflected from radiation and heat energy that is generated by the contents of the camera housing so that the camera housing temperature does not exceed the maximum rated temperature.

Another object is to provide such an environmental shroud which protects the camera housing from rain or any other type of moisture by providing a tortuous path which prevents water penetration inside the environmental shroud.

Yet another object of the invention is to provide an environmental shroud having a “drip edge” so that the water has a means of falling off the environmental shroud to avoid obstructing the optical surface of the camera housing.

These and other objects of the invention are accomplished by a camera assembly having a housing which comprises an environmental shroud having a configuration which reflects and/or deflects heat energy, dissipates heat energy not reflected and/or deflected, protects the camera from water or other moisture, and enables a high level of heat dissipation even when the camera is operated in sunlight at high ambient temperature.

Preferably, the environmental shroud includes a coating to deflect the heat energy and a vent to dissipate the heat energy. In the most preferred embodiments, the shroud also includes a drip edge for water or moisture to run off of the camera housing.

DETAILED DESCRIPTION OF PREFERRED EMBODIMENTS

Figure 1A:
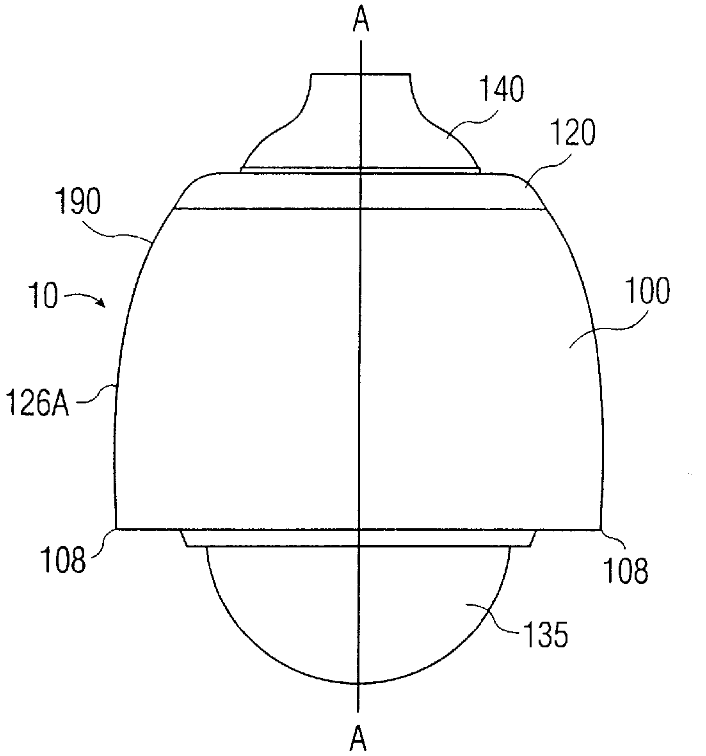
FIG. 1A shows an external view of a first embodiment of a camera assembly of this invention.
Figure 1B:
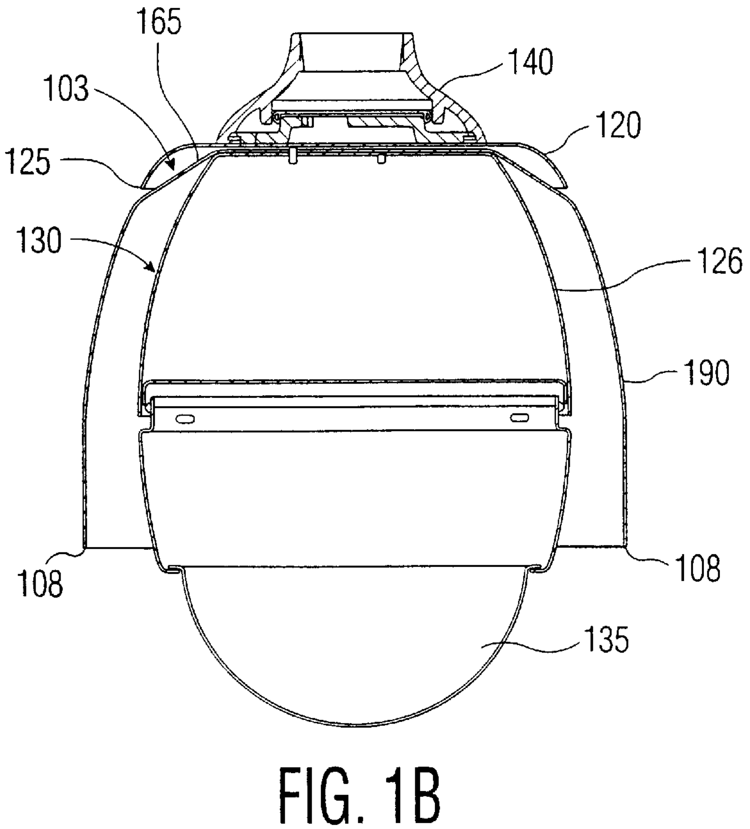
FIG. 1B is a vertical cross-section of the embodiment illustrated in FIG. 1A taken along line A—A.

With reference to FIGS. 1A and 1B, there is illustrated a camera assembly 10 which comprises a mounting cap 140 attached to sidewalls 126 which are in turn attached to an optical surface 135 to form a camera housing 130 which surrounds a camera or lens assembly, not shown, all as is well known in the art. Attached to the camera housing 130 is an environmental shroud 190 which is effective to deflect heat energy, dissipate heat energy not reflected, protect the camera from water and/or other moisture, and enables a high level of heat dissipation even when the camera is operated in sunlight at high ambient temperature. According to a first embodiment of the invention illustrated in FIG. 1A, a two-piece environmental shroud 190 surrounds the camera housing 130 substantially completely and comprises a lower section 100 and an upper section 120. The lower section 100 of the environmental shroud provides the protection from radiant heat energy for the camera housing 130 and may include a coating on a surface thereof or the surface itself may be specified so that the emissivity is such that it reflects or deflects most of the radiant heat energy from the sun or any other hot body. Suitable coatings may include polyester, polyurethane, epoxy, transparent metallized polycarbonate coatings, aluminum foil inside various transparent materials, galvanized steel, powder coatings, etc.

The shroud also includes means to remove heat either absorbed from radiated heat energy or convected from the camera housing 130 through a vent 105 included in the top of the lower section 100. The upper section 120 of the environmental shield covers the vent 105 in the lower section 100. The lower edge 125 of the upper section is below the vent 105, thus providing a tortuous path that prevents water from penetrating and adhering to the camera housing 130. Instead the water is lead away from the housing via the environmental shroud to a drip edge 108 from which water, rain, melted snow, or other moisture will run off the environmental shroud. This configuration prevents water from adhering to the optical surface 135 and impairing optical performance. In a preferred version of this embodiment, a ridge or a valley 103 is formed in front of the vent 105 to further assist in preventing the egress of water or other moisture into the vent. This is particularly preferred when the difference in height between the lower edge 125 of the top portion 120 and the vent 105 is not great enough to establish a tortuous path which prevents water penetration of the camera housing 130.

Figure 3A:
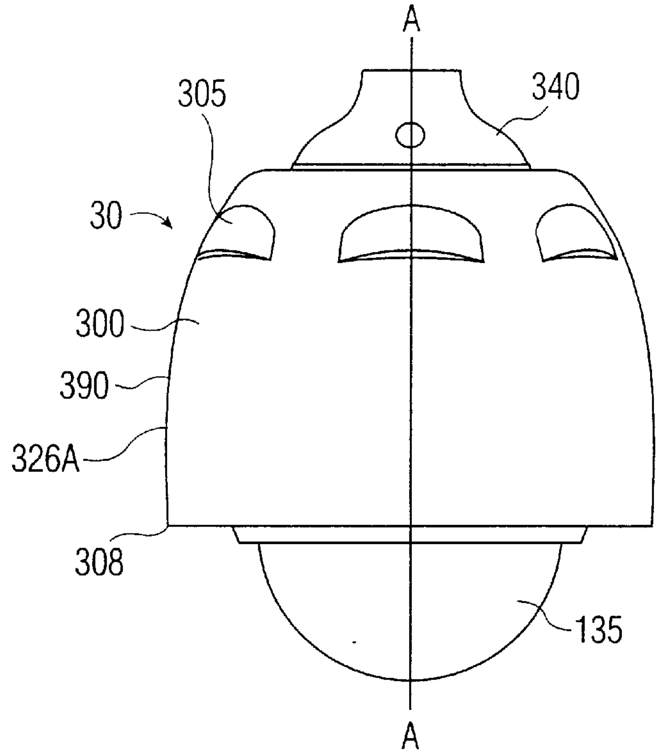
FIG. 3A shows an external view of a third embodiment of a camera assembly of this invention.
Figure 3B:
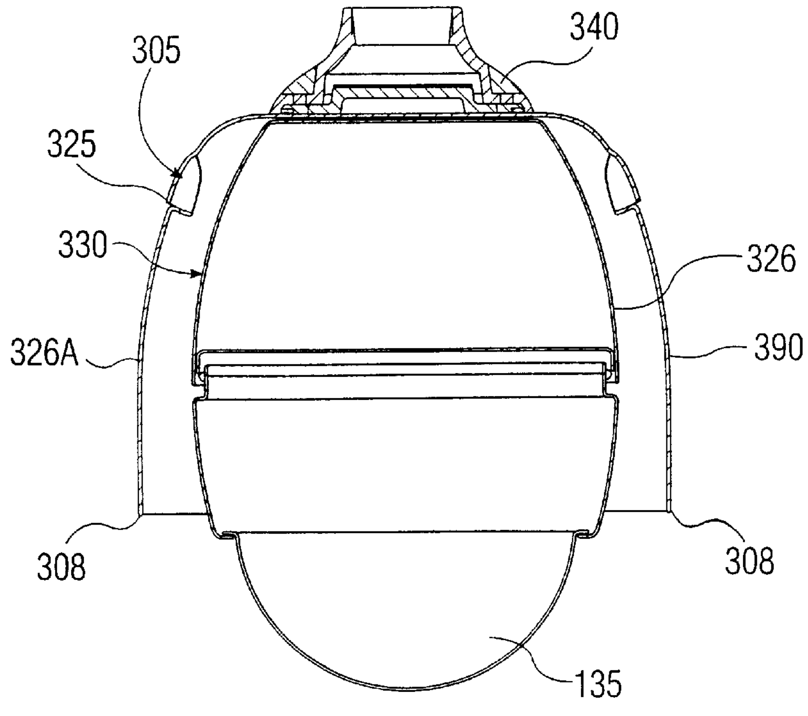
FIG. 3B is a vertical cross-section of the embodiment illustrated in FIG. 3A taken along line A—A.
Figure 4A:
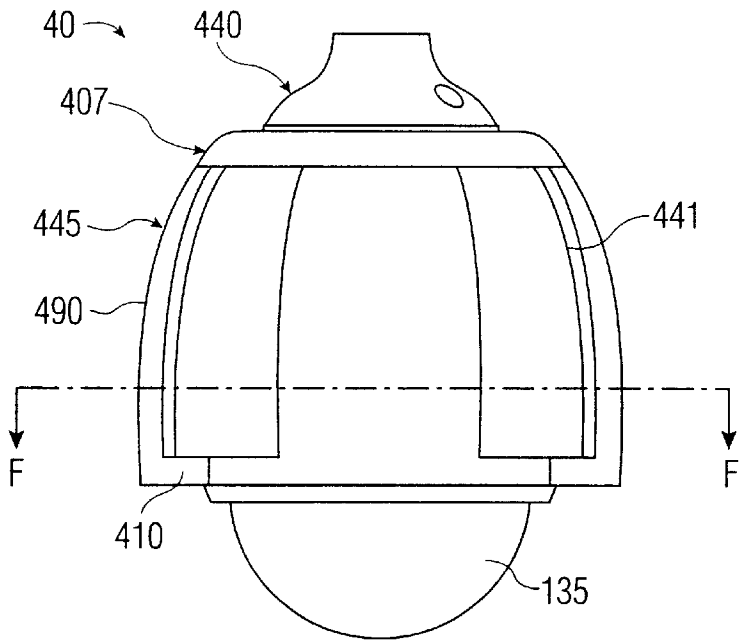
FIG. 4A shows an external view of a fourth embodiment of a camera assembly of this invention.
Figure 4C:
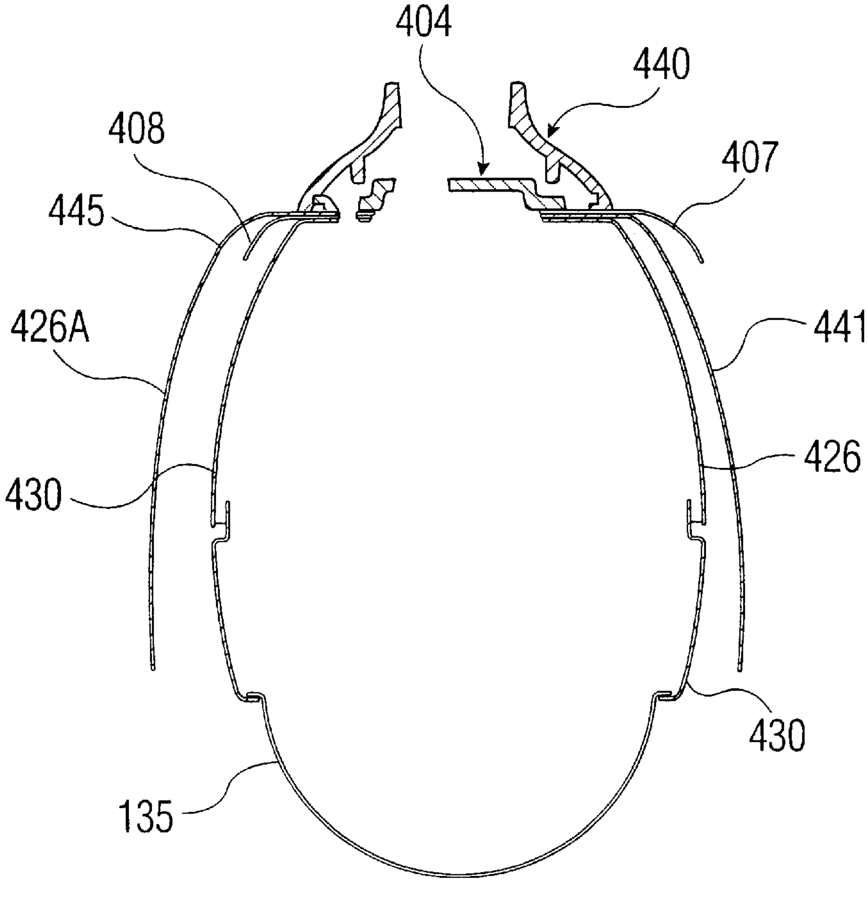
FIG. 4C is vertical offset cross-section of the embodiment of FIG. 4B taken along the line C—C.
Figure 4B:
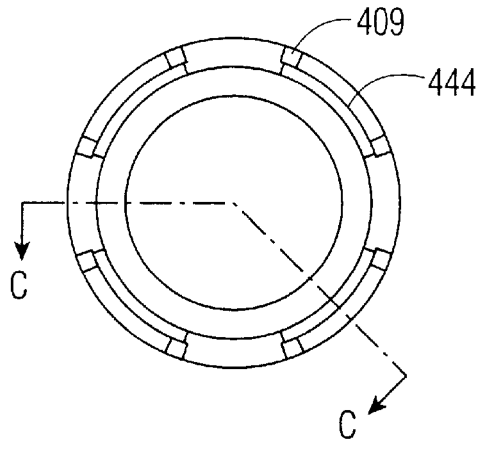
FIG. 4B is a bottom view of the embodiment of FIG. 4A.
Figure 4D:
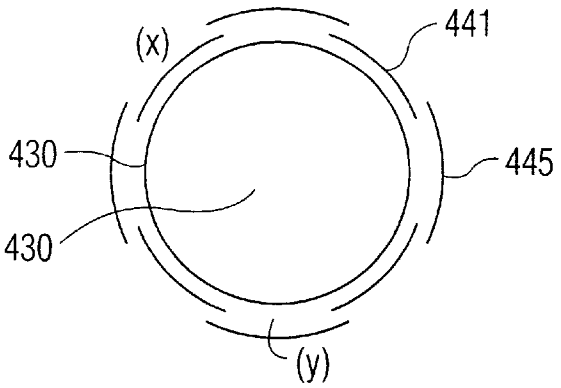
FIG. 4D is a sectional view taken along line F—F of FIG. 4A.
Figure 4E:
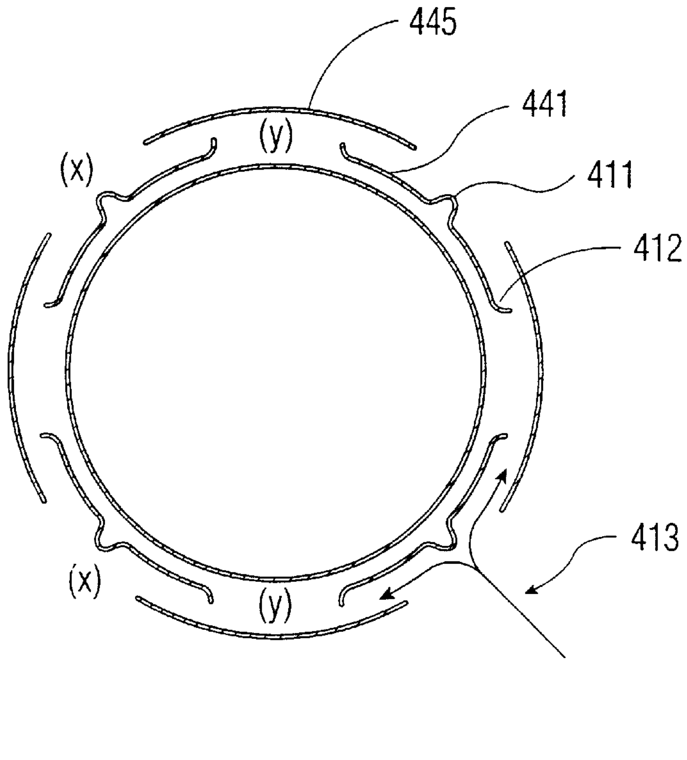
FIG. 4E is a sectional view of an alternative embodiment of the invention illustrated in FIG. 4A.

The embodiment of the invention illustrated in FIGS. 3A and 3B is substantially the same as the FIG. 1 embodiment described above except that it of a one-piece construction. Thus the environmental shroud embodiment of this figure achieves the same function as that achieved by the FIG. 1A embodiment except that it is a one piece design. The single piece of the environmental shroud 390 prevents water from entering the cavity between the shroud and the camera housing, protects the camera housing from radiant heat energy, and provides a drip edge 308 to prevent water from running on to the optical surface 135. Louvres 305 are located on the sides near the top let the hot air escape and also provide protection from rain penetrating and adhering to the camera housing 330 and impairing the optical surface 135.

Figure 2A:
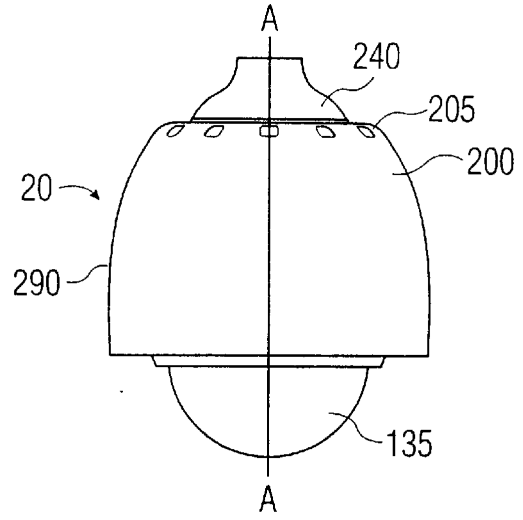
FIG. 2A shows an external view of a second embodiment of a camera assembly of this invention.
Figure 2B:
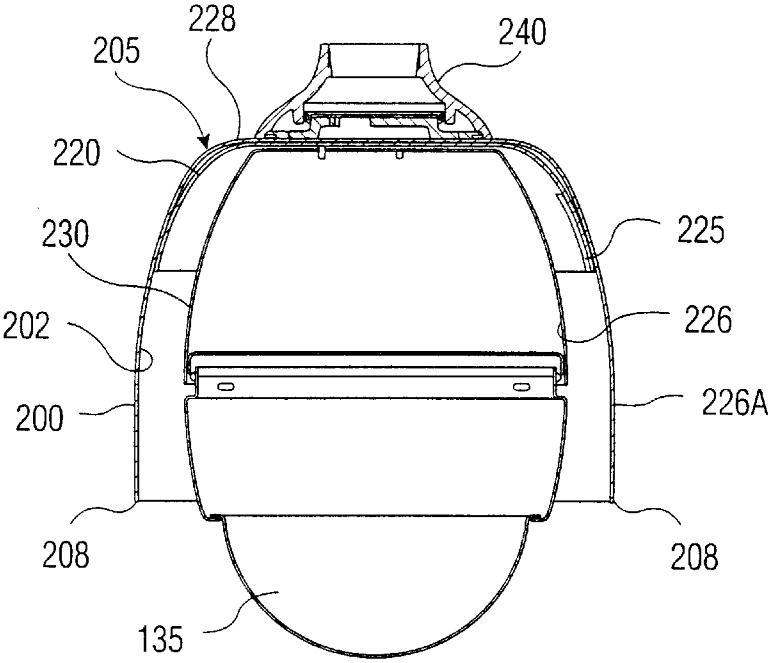
FIG. 2B is a vertical cross-section of the embodiment illustrated in FIG. 2A taken along line A—A.
Figure 2C:
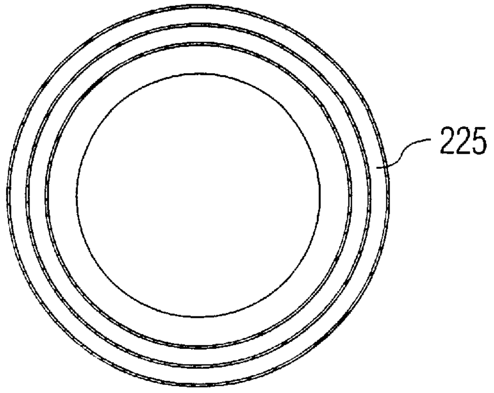
FIG. 2C is a bottom view of the embodiment of the invention illustrated in FIGS. 2A and 2B.
Figure 2D:
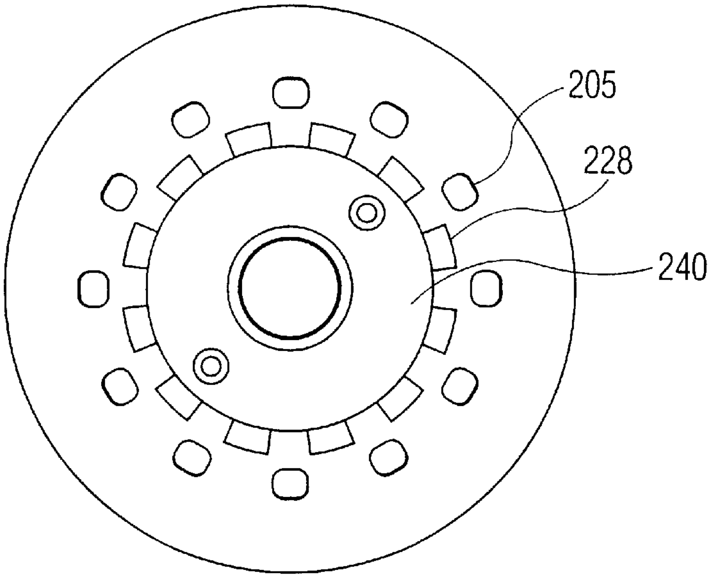
FIG. 2D is a top view of the embodiment illustrated in FIG. 2A.

In the embodiment of the invention illustrated in FIGS. 2A, 2B, and 2C, the environmental shroud 290 achieves the same function as shroud 190 illustrated in FIG. 1A but has a different mode of operation. Shroud 290 is a two piece design having an inner shroud 220 and an outer shroud 200 where the outer shroud 200 performs multiple functions. The outer shroud 200 provides protection for the camera housing 230 by reflecting and removing radiant heat energy. It prevents rain from penetrating the camera housing 230. The outer shroud 200 also provides the means of preventing water from adhering to the optical surface 135 by providing a drip edge 208. The outer shroud 200 has vents 205 in a top portion that not only allow hot air to escape, but also allow the water to penetrate inside the outer shroud 200. The inner shroud 220 then collects the water that penetrates the vent 205 and redirects it along the inside surface 202 of the outer shroud 200 through water channels 225 located on the inner shroud 220. The inner shroud also has vents 228 in the top that let the hot air escape. These vents are above and/or offset to the vents 205 in the outer shroud 200. Thus, the water does not penetrate the inner shroud 220 and does not adhere to the camera housing 230 and impair the optical surface 135.

Figure 2E:
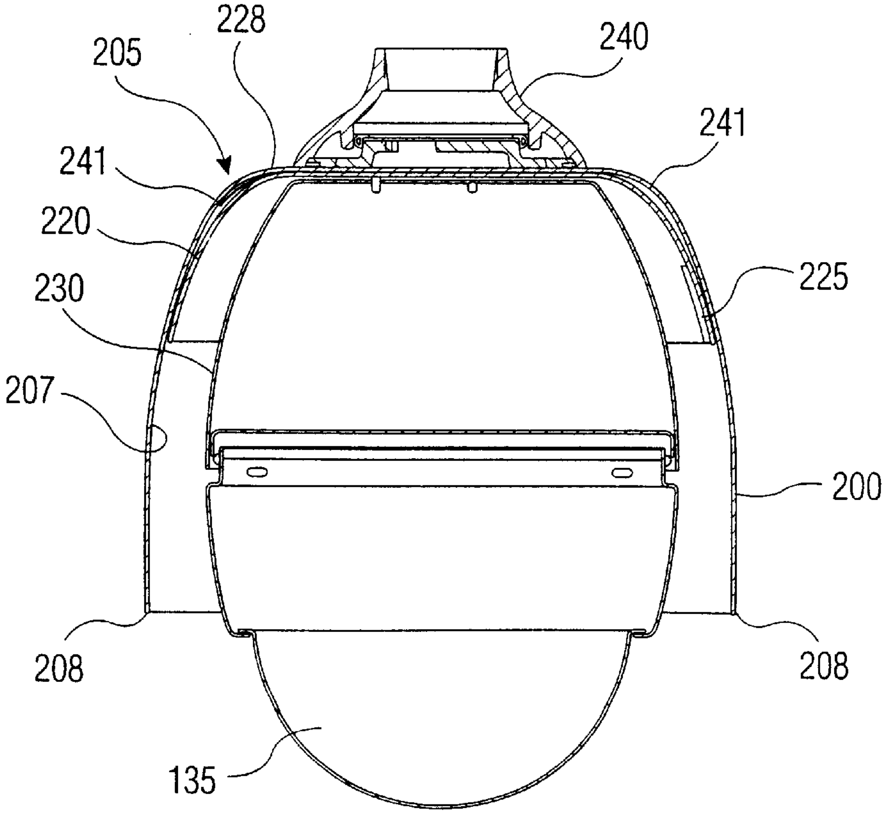
FIG. 2E is a vertical cross-section similar to FIG. 2B and showing an alternative embodiment of the invention.

In an alternative embodiment illustrated in FIG. 2E, at least a pair of bimetallic strips 241 are positioned over or under the vents 205. These strips are actuated to close the vents when the temperature falls below a certain level such that warm air cannot escape from the assembly during colder weather. These strips also provide insulation to keep the contents of the camera housing 130 from dropping below a certain temperature level. It will be understood that such bi-metallic strips may be used in combination with any embodiment of the invention that includes vents and function as described above. It will also be understood that vents may be included in any embodiment of the invention including the embodiments described in FIGS. 4A–5B below.

Figure 5A:
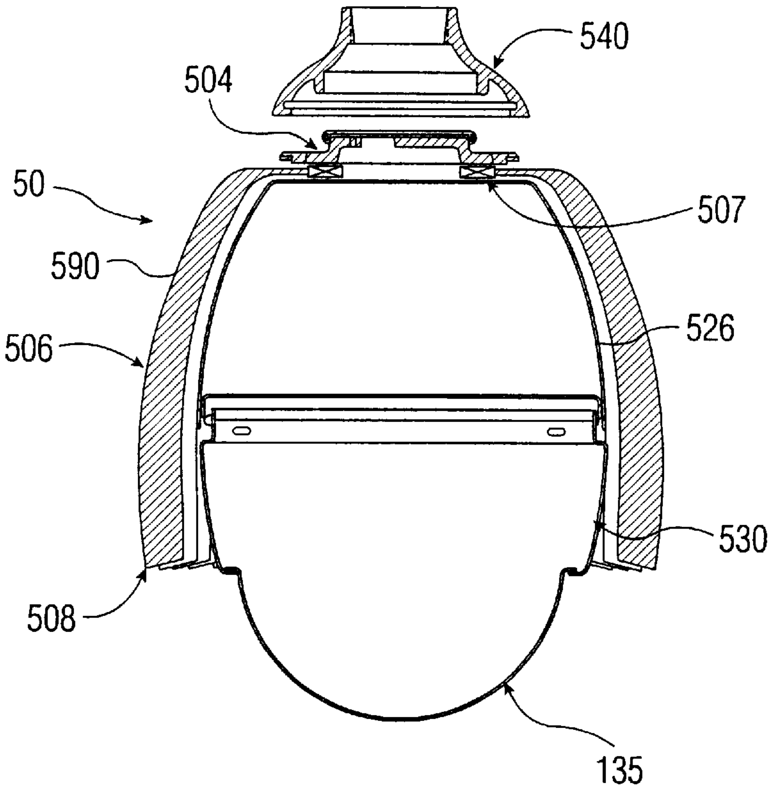
FIG. 5A is a vertical cross-section of a fifth embodiment of the a camera assembly of this invention.

With reference to FIGS. 4 and 5, the embodiments illustrated therein are different from the embodiments discussed and illustrated in the preceding figures in several aspects. First, these environmental shrouds do not present a largely smooth surface appearance. This is to promote enhanced convection heat transfer from a larger portion of the surface of the housing than is obtained by the natural convection to produce a lower internal housing temperature at the maximum ambient temperature. These embodiments also avoid a large cavity in which insects or other pests might be likely to take up residence. Secondly, these embodiments are of modular construction which allows for smaller tooling and part shipping volume prior to assembly. As will be seen, the overall outer profile need not be a "bell" or domed shape and allows for a the multi-piece construction that "wraps" around the housing to give design appearance alternatives. Thirdly, since convection plays a larger heat transfer role than conduction, the various parts of these embodiments may preferably be constructed of weather-resistant non-metallic materials, resulting in considerable cost savings.

With reference to FIG. 4, there is illustrated a modified aero-foil environmental shroud 490, which, like the previous embodiments, has no moving parts. As illustrated in FIGS. 4A and 4B, a camera assembly 40 has a camera housing 430 having a mounting cap 440 attached to sidewalls 426 which are attached to an optical surface 135. As best seen in FIGS. 4B and 4D, two rings of vertical strips 441 and 445 are placed concentric with the housing 430. The inner ring of strips 441 is placed at some distance from the housing 430, and the outer ring of strips 445 at some distance from the inner ring of strips 441, such that air can circulate between all three, i.e. in the gaps between 430, 441 and 445. The inner strips 441 are positioned at the gaps (x) between the outer strips 445 so an air stream 413 traveling to the housing surface 430 must turn and flow tangentially for some distance after radially entering the outer gap (x). Therefore precipitation moisture entering radially through the outer gap (x) will strike the inner strips 441 and drain downward without reaching the camera housing 430 or the optical dome surface 135.

The strips 441 and 445 are secured at top and bottom by structural cap 407, 408 and ring 409, 410 parts such that they maintain their relative alignment. In addition, the mounting cap piece 440 mates with the camera housing 430 to prevent water ingress at the top of the environmental shield 490. In one embodiment, the external vertical strips 445 are partial cylinder shapes attached to the inside lip of a circular top cap 407 such that the overall shape is cylindrical. The internal vertical strips 441 are also attached to the lip of another smaller circular cap 408 attached underneath the larger cap.

The internal strips 441 preferably have a central outfacing vertical ridge profile 411 to direct the air stream behind the external strips when wind impinges normal to the outer gap, and set up a circulating venturi effect when the wind impinges normal to the center of the external strip 445. In a variation thereof, outwardly facing radial edges 412 on both sides of the inner strips 441 are turned to further prevent precipitation from blowing into contact with the camera housing 430.

Figure 5B:
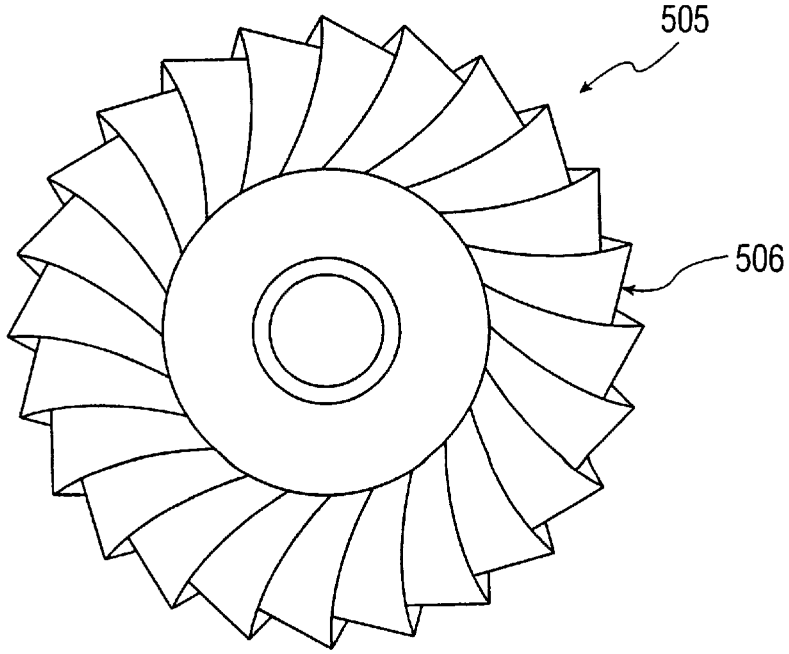
FIG. 5B is a top cross-section of the embodiment illustrated in FIG. 5A.

FIG. 5 illustrates an embodiment of the invention in which the camera assembly 50 comprises an environmental shroud 590 which is a modified turbine with moving parts. The shroud includes a bearing 507 which is centrally positioned at the top of the camera housing 530. This bearing is large enough to permit camera power supply, video, and control wires (not shown) to pass through the center bore. In the case of a ball bearing, the center race is firmly attached to the camera housing 530. An example of a turbine blade assembly 505 is illustrated in FIG. 5B.

The turbine blades 506 are attached firmly to the outer race of the bearing 507 and is coupled to the camera housing 503 and the mounting cap 540 via a coupling plate 504, thus forming a structure that protects the bearing from the elements and prevents water ingress at the top. The turbine blades 506 consist of strips of metal that are formed into arcs and overlapped at an angle to the radial direction such that they form vanes to catch the wind and rotate the turbine irregardless of the wind direction. Any wind threatening to force precipitation into the gaps between blades will also rotate the assembly, generating centrifugal force to push the moisture away from the interior.

When no breeze is blowing, the gaps between the blades provide significant area for natural convection. When a breeze is blowing, the stirring action of the turbine blades will promote forced convection at the camera housing surface, further increasing heat transfer. In addition, as a result of this construction, heat transfer conditions around the entire housing are very uniform. The sun shining from one direction will not heat just one side, but the heat will be distributed evenly.

In an alternative embodiment thereof, a continuous ridge or depression running down the center of the blade is added to channel moisture down to the bottom where a taper is provided for a drip edge 508. A ring may be attached at the bottom circumference to provide structural support and is also configured to facilitate the movement of moisture away from the camera housing window 135.

The aesthetic appearance of the moving turbine blades can be modified as desired. For example, strips similar to those illustrated in the FIG. 4 embodiment may be attached over the blades to minimize this effect. In this instance, with no wind, the area available for natural convection is somewhat decreased and when the breeze is blowing, less energy will reach the vanes to turn the turbine assembly. However, the blades will be protected from damage and will be effective to remove heat and protect the camera housing as contemplated herein. It is also contemplated that other combinations of the FIG.4 and FIG.5 embodiments may be realized. For example, inner and outer vertical strips may be employed to partially or completely cover the turbine blades.

While the invention has been described for convenience in the context of an environmental shroud for a camera assembly, and particularly when used to protect outdoor surveillance cameras, it will be understood that the invention is not limited to these embodiments. The environmental shrouds of the invention may be used in any context where it is necessary to protect the contents of a housing from moisture and heat, for example enclosed lighting, electronic equipment, other surveillance equipment such as switches, multiplexers, etc. Additionally, the invention may be embodied in other specific forms without departing from the spirit and scope or essential characteristics thereof, the present disclosed examples being only preferred embodiments thereof.

We claim:

1. A camera assembly (40) which comprises:

a camera housing (430) having a mounting cap (440) attached to sidewalls (426) to which is attached an optical surface (135), the camera housing enclosing a camera system; and an environmental shroud (490) attached to the camera housing and effective to reflect and/or deflect heat energy, dissipate heat energy not reflected or deflected, and protect the camera housing from the ingress of moisture, wherein said shroud comprises a plurality of vertical strips (441,445) situated concentrically with the camera housing (430) and with each other, gaps being present between the vertical strips (441,445) and between the camera housing (430), said vertical strips being attached to at least a top wall of the camera housing.

2. A camera assembly as claimed in claim 1, wherein said strips comprise an inner ring of strips (441) and an outer ring of strips (445) and wherein the inner ring of strips (441) is located at a predetermined distance from the camera housing (430), and the outer ring of strips (445) is located at a predetermined distance from the inner ring of strips (441), and wherein air convection circulates in the gaps present between the strips and the camera housing.

3. A camera assembly as claimed in claim 2, wherein the inner strips (441) are positioned at gaps (x) between the outer strips (445).

4. A camera assembly as claimed in claim 2, wherein the inner and outer strips (441) and (445) are secured at top and bottom by structural cap (407,408) and ring (409, 410) parts, respectively.

5. A camera assembly as claimed in claim 4, wherein the structural cap piece (440) is attached to the camera housing (430) to prevent water ingress at the top of the environmental shroud.

6. A camera assembly as claimed in claim 5, wherein the outer vertical strips (445) are partial cylinder shapes attached to an inside lip of a circular top cap (407) that is attached to the structural cap piece such that the overall shape is cylindrical.

7. A camera assembly as claimed in claim 6, wherein the inner vertical strips (441) are also attached to a lip of a smaller circular cap (408) attached underneath the circular top cap (407) which in turn is attached underneath the structural cap piece.

8. A camera assembly as claimed in claim 2, wherein the inner strips (441) have a central out-facing vertical ridge profile (411) to direct the air stream behind the outer strips (445) when wind impinges normal to the gap (x), and set up a circulating venturi effect when the wind impinges normal to a center of the outer strip (445).

9. A camera assembly as claimed in claim 2, wherein outwardly facing radial edges (412) on both sides of the inner strips (441) are turned to further prevent precipitation from blowing into contact with the camera housing (430).

10. A camera assembly (50) which comprises:

a camera housing (530) having a mounting cap (540) attached to a top wall which includes a connecting device (504) and a bearing (507), and sidewalls (526) to which is attached an optical surface (135), the camera housing enclosing a camera system; and an environmental shroud (590) attached to the camera housing and effective to reflect and/or deflect heat energy, dissipate heat energy not reflected or deflected, and protect the camera housing from the ingress of moisture, wherein said shroud is a turbine and comprises a plurality of vertical blades (506) situated concentrically with the camera housing (530), gaps being present at least between selected vertical blades (506), whereby wind which contacts the blades causes the shroud to rotate and generate a centrifugal force effective to remove moisture from the camera housing (530).

11. A camera assembly as claimed in claim 10, wherein said bearing (507) is centrally positioned at the top wall of the camera housing (530).

12. A camera assembly as claimed in claim 11, wherein the bearing is a ball bearing.

13. A camera assembly as claimed in claim 12, wherein the bearing (507) has a plurality of attachment points to an outer race and a center race attached to the camera housing (530).

14. A camera assembly as claimed in claim 13, wherein the blades of the turbine (506) are attached to the outer race of the bearing.

15. A camera assembly as claimed in claim 11, wherein the blades of the turbine (506) consist of strips of metal formed into arcs and overlapped to form vanes.

16. A camera assembly as claimed in claim 15, wherein said vanes are effective to catch the wind and rotate the turbine irregardless of the wind direction.

17. A camera assembly as claimed in claim 11, wherein a ridge is present on a surface of at least multiple blades of the turbine and is effective to channel moisture down to a drip edge (508).

18. A camera assembly as claimed in claim 11, wherein a ring is attached at a bottom circumference of said turbine to provide structural support.

19. A camera assembly as claimed in claim 18, wherein said ring is configured to facilitate the movement of moisture away from the camera housing (530).

20. An environmental shroud (490) attached to a housing (430) having a top portion (440) attached to sidewalls (426) to which is attached a bottom wall, said environmental shroud (490 being effective to reflect and/or deflect heat energy, dissipate heat energy not reflected or deflected, and protect the housing from the ingress of moisture, wherein said shroud comprises a plurality of vertical strips (441,445) situated concentrically with the housing (430) and with each other, gaps being present between the vertical strips (441,445) and between the camera housing (430).

21. An environmental shroud as claimed in claim 20, wherein said strips comprise an inner ring of strips (441) and an outer ring of strips (445) and wherein the inner ring of strips (441) is located at a predetermined distance from the housing (430), and the outer ring of strips (445) is located at a predetermined distance from the inner ring of strips (441), and wherein air convection circulates in the gaps present between the strips and the housing.

22. An environmental shroud as claimed in claim 21, wherein the inner strips (441) are positioned at gaps (x) between the outer strips (445).

23. An environmental shroud as claimed in claim 22, wherein the inner strips (441) and outer strips (445) are secured at top and bottom by structural cap (407,408) and ring (409, 410) parts, respectively.

24. An environmental shroud as claimed in claim 23, wherein the structural cap piece (440) is attached to the housing (430) to prevent water ingress at the top of the shroud.

25. An environmental shroud as claimed in claim 24, wherein the outer vertical strips (445) are partial cylinder shapes attached to an inside lip of a circular top cap (407) that is attached to the structural cap piece such that the overall shape is cylindrical.

26. An environmental shroud as claimed in claim 25, wherein the inner vertical strips (441) are also attached to the lip of a smaller circular cap (408) attached underneath the circular top cap (407) which is attached underneath the structural cap piece.

27. An environmental shroud as claimed in claim 21, wherein the inner strips (441) have a central out-facing vertical ridge profile (411) to direct the air stream behind the outer strips (445) when wind impinges normal to the gap (x), and set up a circulating venturi effect when the wind impinges normal to a center of the outer strip (445).

28. An environmental shroud as claimed in claim 21, wherein outwardly facing radial edges (412) on both sides of the inner strips (441) are turned to further prevent precipitation from blowing into contact with the housing (430).

29. An environmental shroud (590) attached to a housing (530) having a top wall, which includes a connecting device (504) and a bearing (507), attached to sidewalls (526) to which is attached a bottom wall, said environmental shroud (590) being effective to reflect and/or deflect heat energy, dissipate heat energy not reflected or deflected, and protect the housing from the ingress of moisture, wherein said shroud is a turbine and comprises a plurality of vertical blades (506) situated concentrically with the housing (530), whereby wind which contacts the blades causes the shroud to rotate and generate a centrifugal force effective to remove moisture from the housing (530).

30. An enviromental shroud as claimed in claim 29, wherein said bearing (507) is centrally positioned at the top wall of the housing (530).

31. An environmental shroud as claimed in claim 30, wherein the bearing is a ball bearing.

32. An environmental shroud as claimed in claim 29, wherein the bearing (507) has a plurality of attachment points to an outer race and center race attached to the housing (530).

33. An environmental shroud as claimed in claim 32, wherein the blades of the turbine (506) are attached to the outer race of the bearing.

34. An environmental shroud as claimed in claim 30, wherein the blades of the turbine (506) consist of strips of metal formed into arcs and overlapped to form vanes.

35. An environmental shroud as claimed in claim 34, wherein said vanes are effective to catch the wind and rotate the turbine irregardless of the wind direction.

36. An environmental shroud as claimed in claim 30, wherein a ridge is present on a surface of at least multiple blades of the turbine and is effective to channel moisture down to a drip edge (508).

37. An environmental shroud as claimed in claim 30, wherein a ring is attached at a bottom circumference of said turbine to provide structural support.

38. An environmental shroud as claimed in claim 37, wherein said ring is configured to facilitate the movement of moisture away from the camera housing (530).

* * * * *